Jan. 12, 1943.  J. B. KUCERA  2,307,930
SEPARABLE CLAMPING DEVICE FOR HARROW BARS
Filed Feb. 13, 1941
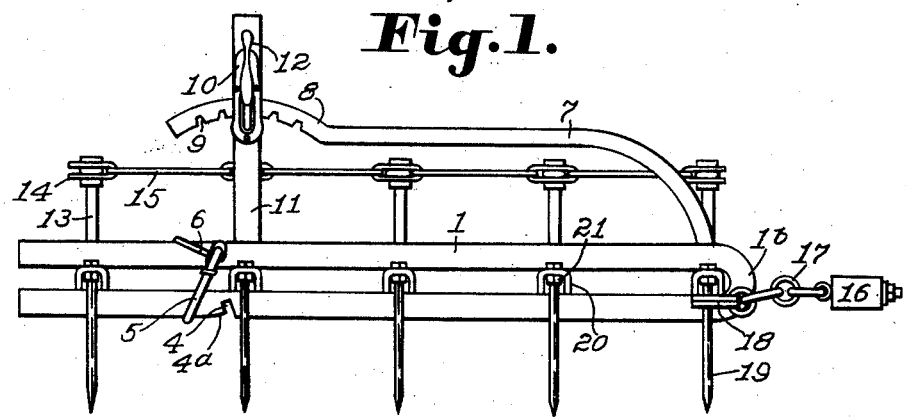
Fig. 1.
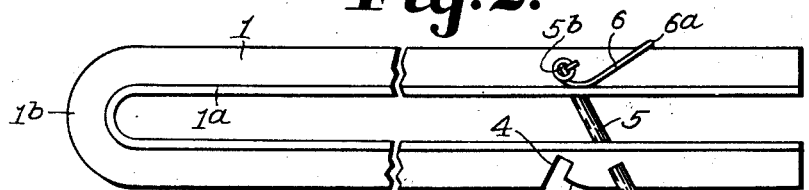
Fig. 2.
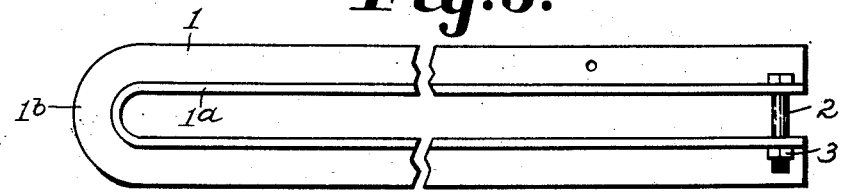
Fig. 3.
Fig. 4.
Fig. 5.
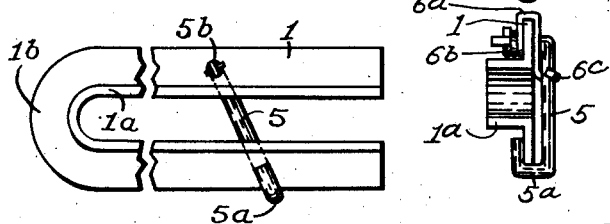
Fig. 6.
Inventor
Joseph B. Kucera,
By G. C. Kennedy
Attorney Patented Jan. 12, 1943

2,307,930

UNITED STATES PATENT OFFICE 2,307,930

SEPARABLE CLAMPING DEVICE FOR HARROW BARS

Joseph B. Kucera, Clark Township, Tama County, Iowa

Application February 13, 1941, Serial No. 378,750

1 Claim. (Cl. 24—258)

My invention relates to improvements in separable clamping devices for harrow beams, and the object of my improvements is to provide at one or both sides of a harrow whose spaced transverse beams are loosely linked together tiltably a substantially U-shaped bar with its limbs seated across the beams and including releasable locking means thereon for securing them thereto to maintain the beams fixedly in one position relative to the bar or bars.

Another object of my improvements is to provide resilient means for adjustably releasably holding the locking means for slidable or swinging adjustments upon the members of the clamping arms.

Another object of my improvements is to adjustably clamp the open end parts of the arms by a bolt and nut connection therebetween adjustably.

Another object of my improvements is to position a locking notch in a flange of one arm of the device, opening outwardly, to receive therein releasably an inturned end hook of a rod whose other end is rockably mounted on the flange of the opposite arm, and also including a locking spring connection also mounted on said opposite arm and having an end hook clasping the flange on the same arm, to releasably hold the rod in a tensioned state as adjusted.

I have accomplished the above objects by the means which are illustrated in the appended drawing, and described in the accompanying claims.

Fig. 1 is a side elevation of one of my separable clamping devices as mounted across end parts of tiltably connected harrow beams and releasably connected thereto.

Fig. 2 is a side elevation, with parts broken away, and on an enlarged scale of one of said harrow clamps with a resiliently controlled swingable arm engaged to and between the opposed members of the device.

Fig. 3 is a like broken away and end connected clamp as shown in Fig. 2, being supplied only with a bolt and nut connection.

Fig. 4 is a top plan of one of the clamping arms of the device, as shown in Fig. 2, and Fig. 5 is an end elevation of the device opposite its bend, and as shown in said Fig. 2.

Fig. 6 is a side elevation of the U-shaped bar with a pivoted swingable connection to the flange of the upper arm and having a depending upwardly opening hook slidably engaging the flange of the lower arm.

Similar numerals are applied to similar parts throughout the several views.

As shown in Fig. 1, the numeral 20 denotes forwardly spaced downwardly opening channel bars, having fixed thereon to depend therefrom like harrow teeth 19. A plurality of loose linkages 15 linked as in 14, have at their joints post connections 13 erected on said channel bars, permitting swinging adjustments of the teeth 19. As usual the inclination of the teeth may be varied by the adjustable connection devices, being the upwardly directed and forwardly bent arm 7 having an arcuate free end 8 with its lower dentated edge part adjustably connected to and across the part 11 which is rigidly mounted on the harrow in a well known manner, not shown. The plate 10 fixed on the upper part of the part 11 carries a releasable locking member 12, also as usual. An end bracket 18 has linkage 17 between it and a draft beam 16.

I have provided a simple and strong locking member 1 of elongated U-shape, being an anglebar, but the said member may be without an angle part 1a if desired. The bar 1—1a is bent medially at 1b and curvilinearly to have its members somewhat resilient and spaced apart as shown.

I have shown in Figs. 2 and 3 somewhat varied separable linking connections between the unconnected members 1 and 1a, but believed to be patentable as shown. Referring to Figs. 2 and 4, the numeral 5 denotes a swingable arm having a laterally bent end part at 5b which rockably seats through an apertured bearing in the web part 1 and flattened at 5b. The lower end part 5a is bent reversely and hooked upon the lower member of the bar 1—1a. A resilient rod 6 has one end bent angularly and traversing a hole in the flattened termination of the arm 5 with the other end of the rod bent inclinedly upwardly and bent to be hooked across the web part 1, and the part 5a may be adjusted along the flange 1. The depending flange of the lower arm may be notched downwardly as at 4, slopingly, and the hook 5a may be slid into this notch along the curvate edge part 4a. The device shown at Fig. 3 may have its members adjustably spaced apart to clamp the upper and lower flanges of the channel bars 20, by means of a bolt 2 and nut 3.

It will be seen, that the said clamping device when seated and secured upon and across the channel-bars 20, will render the harrow rigid, yet the device is readily removable from the harrow.

A simpler device is, however, shown in Fig. 6, wherein is shown a single clamping member 5 having its angularly bent upper end rockably mounted in a bearing aperture in the flange 1, and the upwardly hooked lower end part 5a is swingably hooked about the lower flange. It will be seen that in this combination, the arm 5 may swing to and fro slidably along the lower edge of the lower arm flange 1 to clamp the arms of the device adjustably and frictionally lockably on a beam 20, and variably according to the beam part embraced thereby in fitting the beam tightly between the arm members.

I claim:

A clamping device of the character described, consisting of a U-shaped resilient bar, outwardly flanged, the flange of the lower arm being obliquely notched, the notch being inclined toward the free ends of the bar, with the inner right hand cross wall of the notch diminished curvilinearly toward the free end of the bar, a rigid rod pivoted at its upper end to the flange on the upper arm with an end hook bent to be ridable along the lower arm under reactive tension to be guided removably into the oblique notch releasably lockably, and a resilient hooked arm having one end secured pivotally to the upper arm flange and rigid arm and having its outer hooked end embracing the upper edge of said flange slidably under such normal tension to retain the rigid rod releasably in the oblique notch of the lower arm.

JOSEPH B. KUCERA.